UNITED STATES PATENT OFFICE 2,493,333

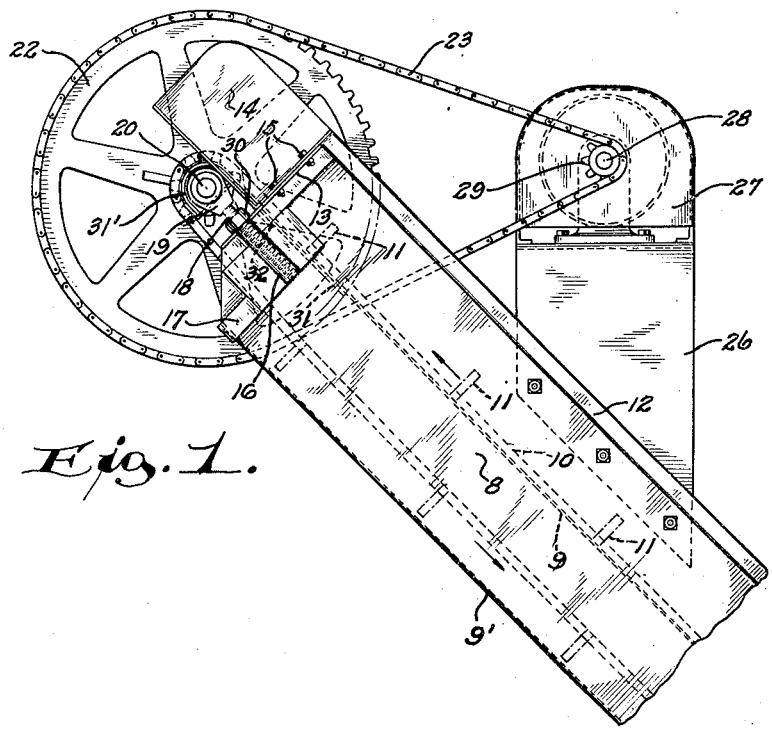

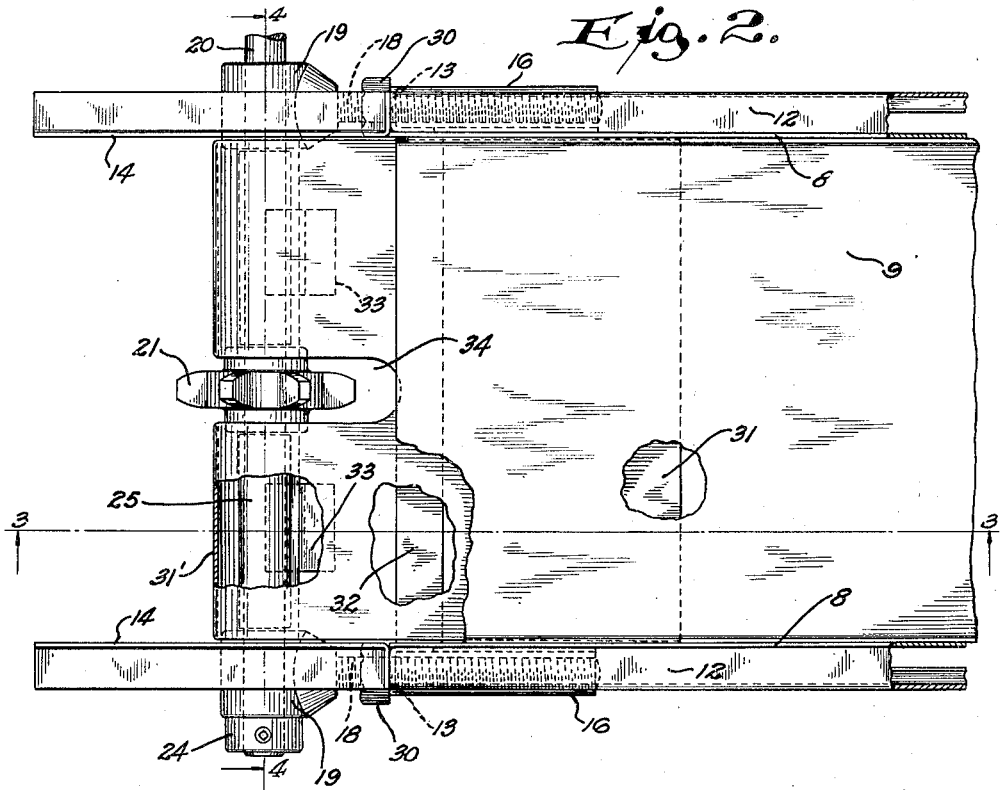
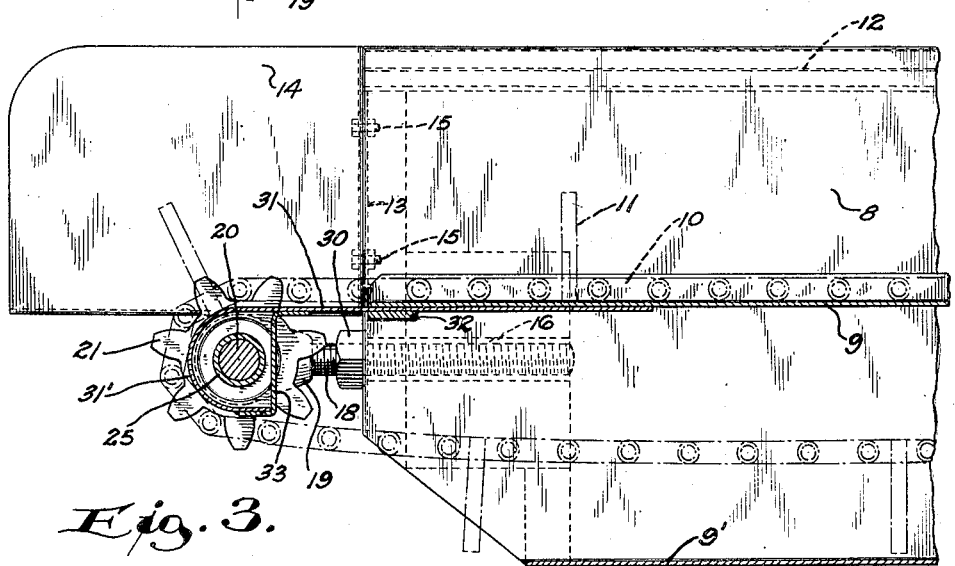

CONVEYER

Herman W. Baehr, Waupaca, Wis., assignor to Eagle Manufacturing Company, Appleton, Wis., a corporation of Wisconsin Application July 19, 1946, Serial No. 684,823

7 Claims. (Cl. 198—203)

This invention relates to improvements in conveyors, and more particularly to an elevating conveyor having a driving member or source of power mounted directly thereon with a flexible connection between the source of power and a driven part of the conveyor.

The invention is concerned particularly with that type of conveyor which is used for elevating semi-fluent material from a loading point to an outer discharge point and the conveyor comprises generally an elongated walled enclosure formed with a longitudinally extending deck or partition along which the material is conveyed and adjacent both sides of which an endless, flight-equipped chain is directed. The flight-equipped chain constitutes the material-moving means and at its outer end it is directed about a driven sprocket which is mounted on a transverse driven shaft carried by adjustable bearings. Said shaft likewise carries a large sprocket which is connected with a source of power, such as a motor, through a flexible connection, the motor being rigidly mounted directly on a portion of the conveyor housing. In arrangements of the type described, from time to time it may become necessary to shift or outwardly adjust the shaft-carrying bearings to take up slack which may develop in the flexible driving connection between the motor and the large sprocket. When such adjustments of the bearings are necessitated, it may result in a condition wherein the shaft, bearings, and other exposed parts are removed from the protection of the discharge end of the deck with the result that the semi-fluent, tenacious material which is adapted to be discharged from the outer end of the conveyor will, in being discharged, splatter over and cake on certain exposed moving members and bearings, thereby interfering with the proper or efficient operation of the same.

With the foregoing explanation in mind, it is, therefore, a primary object of the present invention to provide, in a conveyor of the type described, a longitudinally adjustable apron carried by the adjustable conveyor shaft, which apron closes, in all positions of adjustment, any gap as between the outer end of the conveyor deck and the longitudinally shifted shaft and parts carried thereby, covering and protecting the latter, and being automatically adjustable or extensible with adjustments of the shaft bearings.

A further object of the invention is to provide, in a conveyor structure having a longitudinally adjustable driving shaft, protective apron means carried by the shaft and longitudinally adjustably associated with the conveyor deck or partition.

A further object of the invention is to provide, in a conveyor of the class described an adjustable discharge end protective skirt which is automatically compensatingly shifted when the conveyor shaft bearings are shifted.

A further object of the invention is to provide, in a conveyor of the class described, a protective apron or baffle which may be installed on the conveyor with a minimum of expense and effort but which nevertheless greatly enhances the effectiveness and utility of the conveyor.

A further object of the invention is to provide improvements in elevating conveyor structures which are simple, novel and inexpensive, and which are well adapted for the purposes described.

With the above and other objects in view, the invention consists of the improved conveyor, and its parts and combinations as set forth in the claims, and all equivalents thereof.

In the accompanying drawings in which the same reference characters indicate the same parts in all of the views:

Fig. 1 is a fragmentary side view of the outer or discharge end of an elevating conveyor equipped with the present improvements;

Fig. 2 is an enlarged plan view of the upper or outer end portion of the improved conveyor with parts broken away and in section to show structural details, the driving motor, the large sprocket, and the conveyor chain being omitted;

Fig. 3 is a fragmentary longitudinal sectional view taken on line 3—3 of Fig. 2; and Fig. 4 is a transverse sectional view taken on line 4—4 of Fig. 2.

The conveyor, with which the present improvements are associated, comprises an open top, pan-like container having a pair of spaced-apart side plates 8 divided intermediate their height by a longitudinally extending deck or partition 9, with the lower edges of the sides being joined by a bottom 9'. The divided pan-like enclosure is open at both ends, and the upper portion of the enclosure, above the deck 9, is for the outward, advance travel of conveyed material, while the lower portion of the enclosure between the partition 9 and the bottom 9' receives the return stretch of an endless conveyor chain 10. Intermediately attached to the conveyor chain 10 are spaced, transverse conveyor flights 11 which are adapted to propel material upwardly outwardly along the surface of the deck 9 toward the outer discharge end of the conveyor shown in the drawings, it being understood that only the outer end of the conveyor is illustrated and the inner lower end of the conveyor is associated with a material loading zone or pit.

The upper edge portions of the sides 8 are outwardly and downwardly folded or flanged, as at 12. Also, the upper outer ends of the sides are bent at right angles laterally outwardly, as at 13, the latter forming supporting flanges for similarly bent inner extremities of angled discharge end bearing shields 14. The flanges of the shields 14 which are complementary to the side flanges 13, are secured thereto by bolts 15. On the outer surfaces of the forward ends of the sides 8 are rigidly mounted internally threaded adjusting bolt sleeves 16. Also, the upper outer end of the pan-like container or housing is reinforced by a strap 17.

Bearing adjusting bolts 18 have the major extents of their shanks threadably received by said sleeves 16 and project forwardly outwardly therefrom with their outer ends being turnably secured within shaft bearings 19. The latter are adapted for longitudinal adjustment relative to the outer end of the conveyor housing and revolubly embrace separated portions of a transverse driven shaft 20. The shaft 20 has fast thereon, intermediate its ends, a small sprocket 21 engaged by the conveyor chain 10, and on one extremity said shaft 20 has fast thereon a relatively large sprocket or gear 22 (see Fig. 1) engaged by an endless driving chain 23. The other end of the shaft 20 carries a retainer collar 24. Intermediate portions of the shaft 20 are surrounded by spacing collars 25.

By reference to Fig. 1, it will be observed that on a supporting structure 26 built upwardly from the conveyor housing, there is rigidly mounted an electric motor 27. The motor shaft 28 carries a small sprocket 29 which drivingly engages the endless chain 23. It will thus be seen that the motor 27 provides the power for the driven parts of the conveyor and through the chain 23 and large sprocket 22 the transverse shaft 20 is driven when the motor is in operation. The conveyor chain sprocket 21, being fast on the shaft 20, is thereby turned in a proper direction so that the conveyor chain 10 moves in the direction of the arrows in Fig. 1 to cause the flights 11 to propel material toward the upper outer end of the conveyor enclosure. In mechanisms of this type, after a period of use, undue slackness may develop in the flexible driving chain 23. For this reason, the driven shaft 20 is mounted in the longitudinally shiftable bearings 19 with the result that when undue slack develops in the chain 23, through the adjusting bolts 18 the bearings 19 and shaft 20 may be shifted outwardly as much as is necessary to take up the slack which has developed in the driving chain 23. In this connection, it may be stated that the bearing adjustments may be very readily accomplished with the application of a wrench to the nuts 30 which are fast on the bolts 18.

The conveyor may be used in connection with elevating semi-fluent material such as litter from cattle barns to an outside point of discharge and disposal. Such material is pushed upwardly outwardly along the surface of the deck 9 to the outer discharge end thereof where it drops into a suitable vehicle or receptacle. Due to the nature of the material conveyed, it is especially desirable that the mechanism at the outer end of the conveyor housing be protected or shielded therefrom. This problem becomes particularly pronounced when the shaft bearings 19 are shifted outwardly. The particular feature of the present invention is the association with the adjustable bearings 19 and driven shaft 20 of a protective shield or skirt 31 which automatically functions to cover and shield the exposed portions of the shaft 20 and bearings 19 and to provide a bridge as between the outer end of the conveyor housing deck 9 and the shaft and its associated elements, in any position of adjustment of the shaft.

The shield or skirt 31 is shown most clearly in Figs. 2 and 3 in respect to its relationship to the discharge end of the conveyor housing, the deck 9 and the driven shaft 20. The skirt 31 has its major portion of sheet-like formation and of rectilinear extent with such portion adjustably underlapping the outer or forward end of the deck 9 and shiftably resting on a transverse strap 32 which underlies a forward end portion of the deck 9. Said portion of the skirt 31 is of a width substantially corresponding to the width of the deck. The forward end portion of the skirt 31 is curved about the shaft spacing collars 25, as at 31'. Spaced areas of the shield portion 31' have welded or otherwise secured thereto opposed flanges of Z brackets 33, whereby said portion 31' of the shield 31 is maintained in partially encircling relation relative to the shaft-carried collars 25. It will be evident, therefore, that when the shaft bearings 19 are shifted by the means previously described, the shield 31 will be moved longitudinally, telescoping relative to the deck 9 and strap 32. As the shaft bearings and parts carried thereby are shifted further outwardly relative to the discharge end of the conveyor housing or casing, the corresponding movement of the shield 31 will serve to provide a material carrying bridge as between the forward end of the conveyor casing and the outer surfaces of the shaft 20 and parts carried thereby over which the semi-fluent conveyed material is adapted to cascade in being discharged. It is to be observed that upper and lower portions of the curved end 31' of the shield are cut away or slotted, as at 34 and 35, to accommodate the revolving sprocket 21.

From the foregoing description, the operation of the conveyor improvements will no doubt be obvious. The conveyor provides for longitudinal adjustments of the driven shaft carrying bearings to compensate for slack which may develop in the driving chain 23, and correspondingly the associated shield 31 is compensatingly advanced when the bearings are advanced to bridge any gap which might otherwise result at the outer discharge end of the conveyor casing. Thereby, a supporting surface for the conveyed material is always provided at the outer discharge end of the conveyor regardless of the position of adjustment of the shaft bearings. The conveyor improvements are furthermore simple and automatic in operation and are readily adapted to installation on conveyors of the type under consideration with a minimum of expense and modification. The improvements are furthermore of simple and novel construction and are well adapted for the purposes set forth.

What is claimed as the invention is:

1. In a conveyor, a housing having a deck along which material is advanced to a discharge end, operating means longitudinally adjustably supported on the housing and spacedly beyond the discharge end of the deck, and an adjustable, elongated apron bridging the space between the discharge end of the deck and said operating means in all positions of longitudinal adjustment of the latter, said apron being engaged by and substantially encircling moving portions of said operating means.

2. In a conveyor, a housing having a deck along which material is advanced to a discharge end, a power shaft, means adjustably supporting said shaft on the housing and spacedly beyond the discharge end of the deck, and an extension apron having its outer end embracing said shaft for substantially the full length thereof and having its inner end portion in shiftable lapping relation with the discharge end portion of said deck.

3. In a conveyor, a housing having a flat deck along which material is advanced to a discharge end, a power shaft having mounted intermediate thereof a sprocket, means for supporting said shaft on the housing and spacedly beyond and for adjustments longitudinally of the discharge end of the deck, and an apron connected at its outer end with said shaft to be longitudinally shifted therewith, said apron at its outer end substantially encircling said shaft on both sides of said sprocket and having at its inner end a flat portion in lapping relation with the discharge end of said deck and forming a continuation thereof.

4. In a conveyor assembly, a housing having a flat deck with a discharge end, a transverse power shaft, means for supporting said shaft on the housing and spacedly beyond and for adjustments longitudinally of the discharge end of the deck, flexible drive means for said shaft, an apron connected at its outer end with said shaft to be longitudinally shifted therewith and having a flat inner portion in lapping relation with the discharge end of said deck and forming an extensible continuation thereof, and a conveyor chain movable along said deck and operatively connected with said shaft.

5. In a conveyor assembly, a housing having a flat deck with a discharge end, a transverse power shaft, means for supporting said shaft on the housing and spacedly beyond and for adjustments longitudinally of the discharge end of the deck, flexible drive means for said shaft, an apron connected at its outer end with said shaft to be longitudinally shifted therewith, said apron at its outer end substantially encircling said shaft for substantially the full length thereof, said apron being formed at its inner end with a flat portion in lapping relation with the discharge end of said deck and forming an extensible continuation thereof, and a flight-equipped conveyor chain movable along said deck and apron to advance material for discharge and operatively connected with said shaft.

6. In a conveyor assembly, a housing having a flat deck with an outer end, a transverse power shaft on the housing, bearings for supporting said shaft spacedly beyond the outer end of the deck, adjusting members carried by the housing and engaging said bearings, flexible drive means for said shaft, an apron connected at its outer end with said shaft to be longitudinally shifted therewith upon adjustment thereof to maintain said flexible drive means in taut condition and having a flat inner portion in lapping relation with the outer end of said deck and forming an extensible continuation thereof, and a conveyor chain movable along said deck and apron and operatively connected with said shaft to be driven therefrom.

7. In combination, an open conveyor housing having a flat deck with an outer end, a transverse power shaft, adjustable means carried by the housing for supporting said shaft in desired spaced relation to the outer end of the deck, a motor mounted on the housing, flexible drive means connected with the motor and extending to said shaft, an apron connected at its outer end with said shaft to be longitudinally shifted therewith upon adjustment thereof to maintain said drive means in taut condition and having a flat inner portion in lapping relation with the discharge end of said deck and forming an extensible continuation thereof, and a flight-equipped conveyor chain movable along said deck and apron to advance material for discharge and operatively connected with said shaft.

HERMAN W. BAEHR.

REFERENCES CITED

The following references are of record in the file of this patent:

UNITED STATES PATENTS

| Number | Name | Date |
| --- | --- | --- |
| 1,450,225 | Rebstock | Apr. 3, 1923 |
| 1,770,650 | Levin | July 15, 1930 |
| 1,825,572 | Boger | Sept. 29, 1931 |